Figure 1:
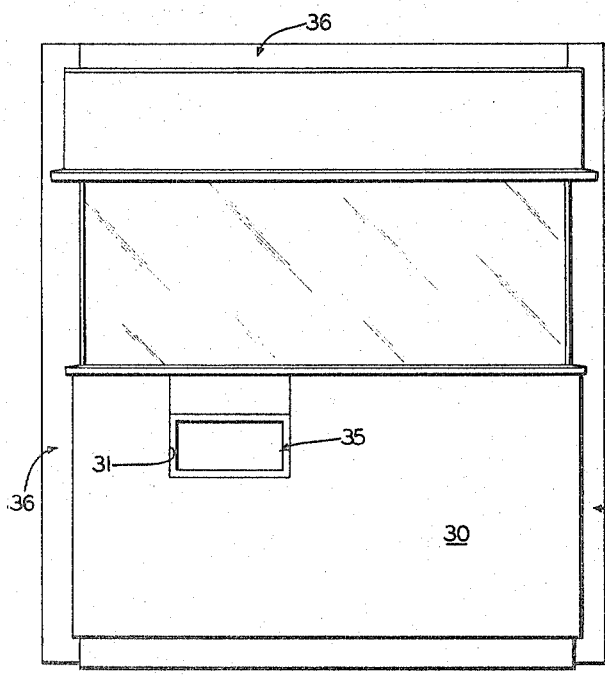

Feb. 7, 1967 D. O. KETTERING ET AL 3,302,871
BANK DRIVE-UP WINDOW AND DEAL DRAWER CONSTRUCTION
Filed Aug. 5, 1965 7 Sheets-Sheet 1

INVENTORS
DALE O. KETTERING,
NACY L. STRICKLAND and
LEO J. GROSSWILLER, JR.
BY Frease, Bishop & Schick
ATTORNEYS

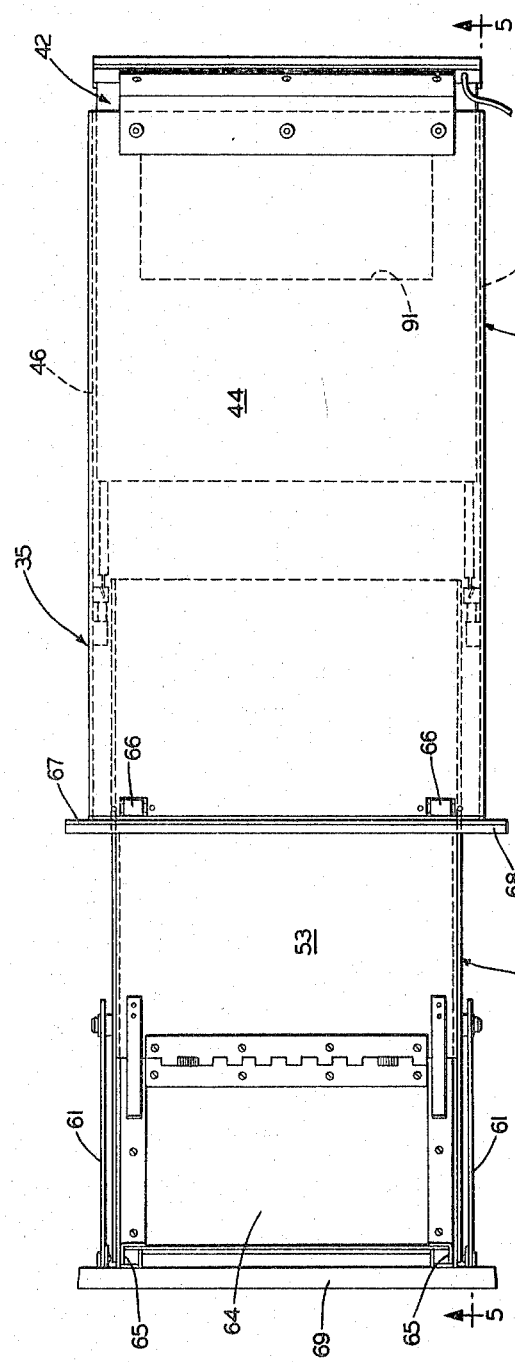

Fig. 6

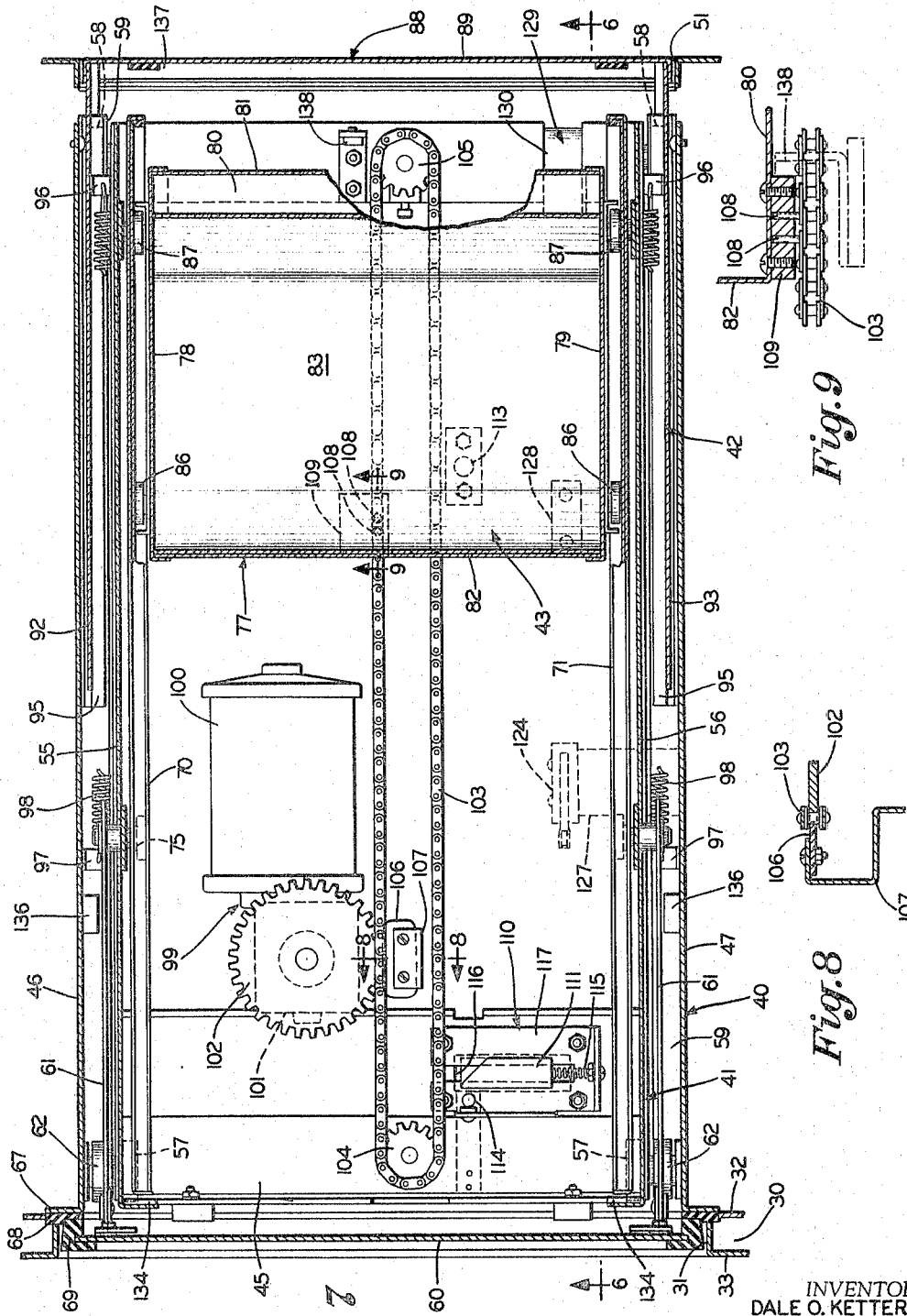

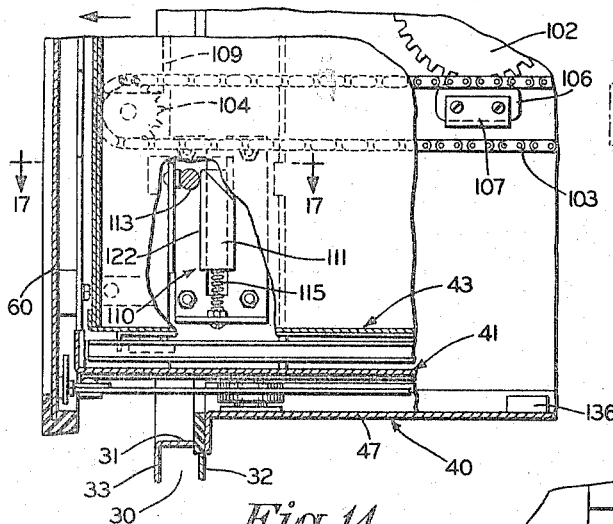

Feb. 7, 1967  D. O. KETTERING ETAL  3,302,871
BANK DRIVE-UP WINDOW AND DEAL DRAWER CONSTRUCTION
Filed Aug. 5, 1965                                7 Sheets-Sheet 6
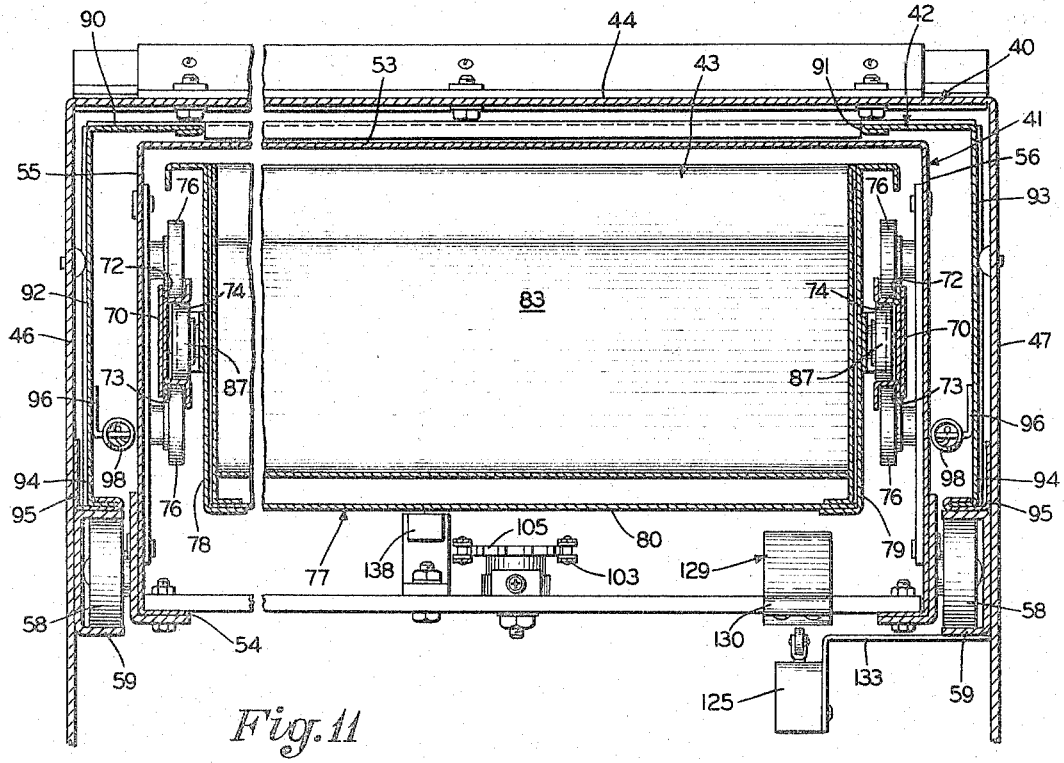
*Fig. 11*
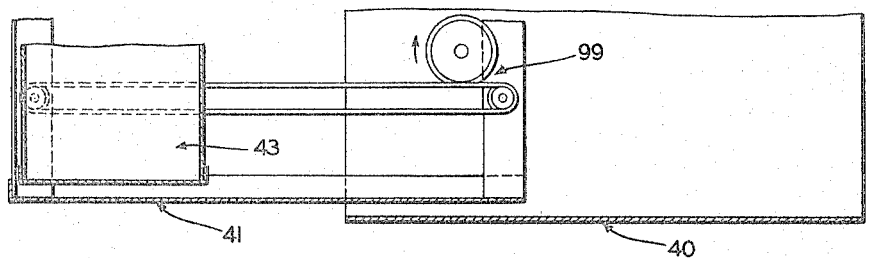
*Fig. 23*
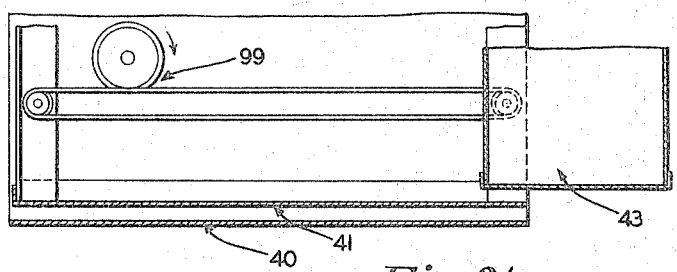
*Fig. 22*
*Fig. 21*
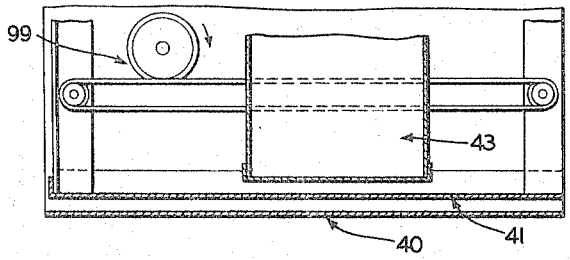
INVENTORS
DALE O. KETTERING,
NACY L. STRICKLAND and
LEO J. GROSSWILLER, JR.
BY Freese, Bishop & Schick
ATTORNEYS

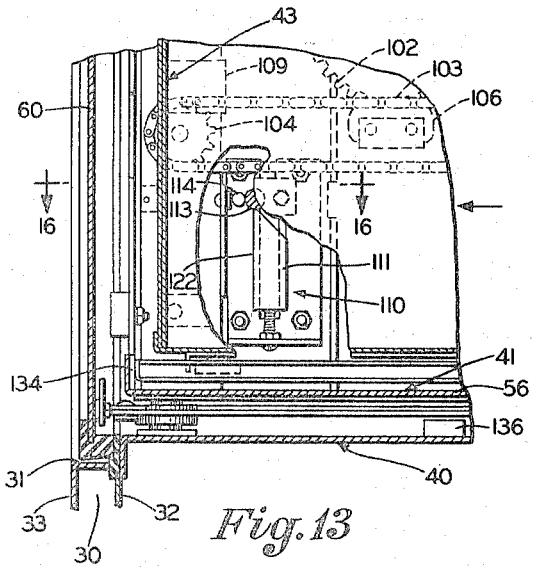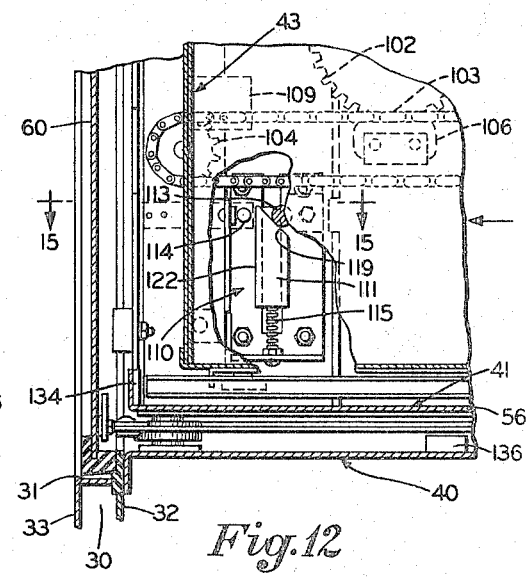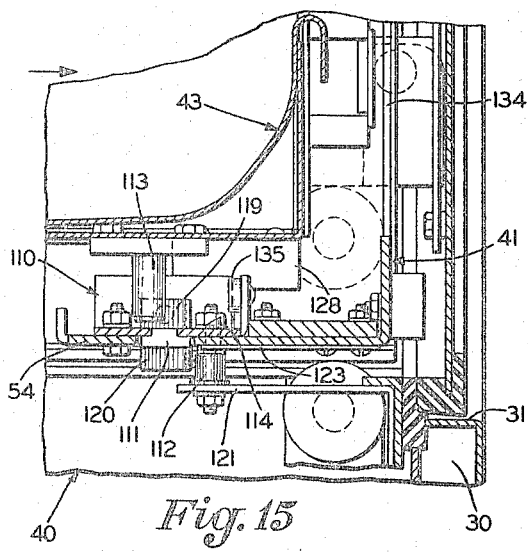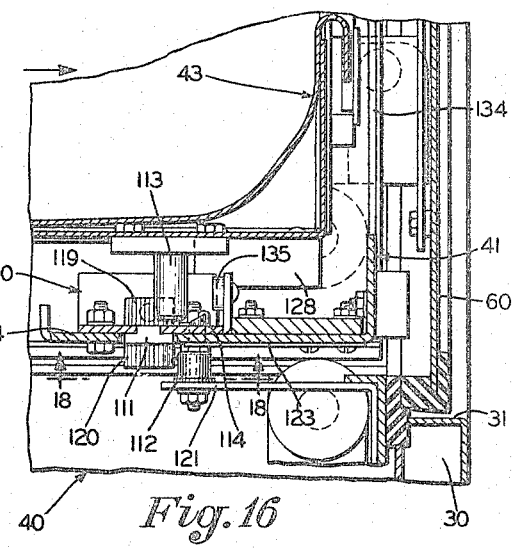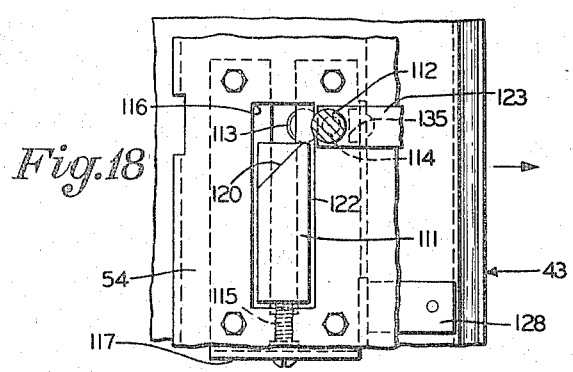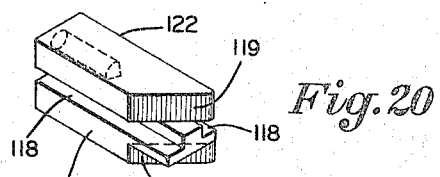

3,302,871
BANK DRIVE-UP WINDOW AND DEAL DRAWER
CONSTRUCTION
Dale O. Kettering, Canton, Nacy L. Strickland, North Canton, and Leo J. Grosswiller, Jr., East Canton, Ohio, assignors to Diebold, Incorporated, Canton, Ohio, a corporation of Ohio
Filed Aug. 5, 1965, Ser. No. 477,565
14 Claims. (Cl. 232—43.4)

Our invention relates to improvements in bank drive-up window and deal drawer constructions, and more specifically to a deal drawer construction having a particular relationship to the drive-up window providing increased ease of accessibility to the deal drawer both by the bank teller and the customer. Even more specifically, certain of the improvements of the present invention relate to a bank drive-up window and deal drawer construction wherein the deal drawer in accessible by the teller inwardly of the teller's counter and the counter can, therefore, be provided unbroken and free from the usual opening normally required for deal drawer access.

In the usual form of bank drive-up window and deal drawer constructions, a receptacle is provided selectively movable through an opening in the window front wall, movable outwardly to a customer accessible position outward of the wall, and inwardly through the wall opening to a teller accessible position inward of the wall beneath the teller's counter. Furthermore, to our knowledge, all of these prior constructions have been arranged so that the teller accessible position of the receptacle is at a location directly beneath the teller's counter, and an opening is required through the teller's counter for teller access to the receptacle.

This has resulted in the necessity of providing automatically closeable cover means for this counter opening so that the opening is automatically closed when the receptacle is moving outwardly toward and rearwardly from the customer accessible position, in order to prevent accidental injuries to the teller during movement of the receptacle, to prevent the passage of air from the customer to the teller side of the window during severe weather, and to prevent objects from accidentally falling downwardly into the deal drawer mechanism. Also, and equally important, this opening through the teller's counter destroys a large amount of what would otherwise be valuable counter working space so that business machines and other equipment normally positioned on the counter for required use by the teller, more and more of which are required to be used in the modern banking business, are required to be positioned remote and less accessible to the teller.

Additionally, in most prior bank drive-up window and deal drawer constructions, it has been necessary to position the teller at the same level as the customer's automobile, since the deal drawers have been movable on a horizontal plane inwardly and outwardly of the window. This locates the teller at a relatively low position and at an inconvenient location for providing the best view of the customer. Where the level of the teller has been raised above the level of the customer's automobile, it has been necessary to provide the deal drawer movable outwardly in a horizontal plane and then vertically to the level of the customer, all of which requires a complicated and expensive mechanism, as well as complex controls therefor.

It is, therefore, a general object of the present invention to provide a bank drive-up window and deal drawer construction which eliminates the difficulties and disadvantages of the prior constructions as discussed above.

It is a primary object of the present ivnention to provide a bank drive-up window and deal drawer construction in which the drawer receptacle is movable between the usual customer accesible position outwardly of the window wall and a teller accessible position spaced rearwardly from the window wall and rearwardly of the back edge of the teller's counter, so that the teller's counter may be free from openings for access to the receptacle and the surface of the teller's counter may be unbroken.

It is a further object of the present invention to provide a bank drive-up window and deal drawer construction in which the drawer receptable is mounted movable between a customer accessible position outward of the window wall and a teller's accessible position spaced inwardly from the window wall and projecting rearwardly from the rear edge of the teller's counter, with the opening through the window wall being closed when the receptacle is rearwardly of the wall, and with the opening through which the receptacle extends at the rear edge of the counter also being closed when the receptacle is forwardly of this counter rear edge.

It is still a further object of the present invention to provide a bank drive-up window and deal drawer construction in which the deal drawer receptacle is mounted on and movable forwardly and rearwardly relative to an auxiliary movable frame, the auxiliary movable frame is mounted on and movable forwardly and rearwardly relative to a main movable frame, and the main movable frame is mounted on and movable forwardly and rearwardly relative to a stationary frame supported beneath the teller's counter, thereby porviding a greatly expanded extent of travel forwardly and rearwardly for the receptacle relative to the stationary frame and teller's counter.

It is an additional object of the present invention to provide a bank drive-up window and deal drawer construction in which a receptacle is mounted movable forwardly and rearwardly beneath a teller's counter in a movable frame while the movable frame remains stationary and with a front wall thereof closing the opening through the window wall, the movable frame is mounted movable forwardly and rearwardly through the wall opening with the receptacle at and stationary relative to the front end of the movable frame, and single latch means performs the dual function of retaining the movable frame stationary and closing the window wall opening during forward and rearward movement of the receptacle relative to the movable frame, and retaining the receptacle at and relative to the front end of the movable frame during movement of the movable frame through the wall opening.

It is also an object of the present invention to provide a bank drive-up window and deal drawer construction having a stationary frame, at least one movable frame movable forwardly and rearwardly relative to the stationary frame, and a receptacle movable forwardly and rearwardly within the movable frame, in which improved drive means for the receptacle and movable frame is provided giving an increased over-all path of travel for the receptacle forwardly and rearwardly relative to the stationary frame, yet in a relatively simple and efficient manner.

It is still a further object of the present invention to provide a bank drive-up window and deal drawer construction having a stationary frame, at least one movable frame movable forwardly and rearwardly relative to the stationary frame, and a receptacle movable forwardly and rearwardly relative to the movable frame, in which a chain-sprocket drive means is provided which operates in the conventional manner with the chain moving over rotating sprockets for movement of the receptacle forwardly and rearwardly within the movable frame, and the same chain is retained stationary relative to the sprockets and acts as a rack for movement of the movable frame relative to the stationary frame.

It is still an additional object of the present invention to provide a bank drive-up window and deal drawer construction having a receptacle movable outwardly through a window wall opening to a customer accessible position and inwardly of the wall to a teller accessible position, in which the path of travel of the receptacle angles progressively uniformly downwardly as the receptacle moves from teller accessible position outwardly to customer accessible position, and angles progressively uniformly upwardly as the receptacle moves rearwardly from customer accessible position to teller accessible position, so that the teller may be positioned at a level above the level of the customer's automobile, and has greatly improved vision of the customer.

Finally, it is an object of the present invention to provide a bank drive-up window and deal drawer construction which satisfies all of the above objects in a relatively simple and efficient manner, and at a minimum of relative cost.

These and other objetcs are accomplished by the parts, constructions, arrangements, combinaitons and subcombinations comprising the present invention, a preferred embodiment of which—illustrative of the best mode in which applicants have contemplated applying the principles—is set forth in the following description and illustrated in the accompanying drawings, and which is particularly and distinctly pointed out and set forth in the appended claims forming a part hereof.

In general terms, the improvements of the present invention may be stated as residing in a bank drive-up window of the type in which an upright window wall having inner and outer sides is formed with a deal drawer opening and a generally horizontal teller's counter extending rearwardly from the wall inner side above the drawer opening, and in which a receptacle is mounted movable and there is means for selectively moving the receptacle through the drawer opening forwardly to a customer accessible position outward of the wall outer side and rearwardly beneath the counter to a teller accessible position inward of the wall inner side.

One of the improvements of the present invention preferably includes the provision of an unbroken teller's counter free from receptacle or access openings through the counter, that is, above the forward and rearward path of travel of the receptacle beneath the counter. Further, the receptacle is mounted for the forward and rearward movement through various frame means with the frame means being constructed and arranged not only to provide movement of the receptacle outwardly through the wall opening to the customer accessible position, but rearwardly beneath the customer and projecting rearwardly from the rear edge of the counter so as to provide teller access rearwardly of the counter edge. Still further, a front wall is provided on the frame means for closing the wall opening when the receptacle is inward of the wall, and a shield member is provided for closing the opening through which the receptacle extends at the rear edge of the counter when the receptacle is forwardly of the counter rear edge and free from projecting rearwardly of the counter edge.

Another improvement of the present invention preferably includes the mounting of the receptacle for forward and rearward movement outwardly through the wall opening to the customer accessible position and rearwardly of the wall inward to the teller accessible position through at least one movable frame within which the receptacle is movable forwardly and rearwardly, and a stationary frame within which the movable frame is movable forwardly and rearwardly relative thereto. The paths of movement of both the receptacle within and relative to the movable frame, and the movable frame within and relative to the stationary frame are angled progressively uniformly downwardly at preferably approximately a 5° angle as the receptacle moves forwardly relative to the movable frame and the movable frame moves forwardly relative to the stationary frame so that the teller accessible position inward of the wall is at a level higher than the customer accessible position outward of the wall.

Still another improvement of the present invention preferably includes chain-sprocket means operably connected to the receptacle for driving the receptacle forwardly and rearwardly between the customer accessible position outward of the window wall and the teller accessible position inward of the window wall. This chain-sprocket means preferably includes an endles chain extending over forward and rearward sprockets rotatably mounted on a movable frame with the receptacle being secured at a particular location to the chain and the chain being driven by a pinion rotatably mounted on a stationary frame. This assembly is arranged so that the pinion drives the chain around the movable frame sprockets and movable relative to the movable frame for movement of the receptacle from teller accessible position forwardly to the window wall while the movable frame remains stationary, and then the pinion drives the chain as a rack with the chain remaining stationary relative to the movable frame and movable frame sprockets for driving the movable frame and receptacle through the wall opening to the receptacle customer accessible position, with the reverse movement of the receptacle back to the teller accessible position being the reverse order of movement.

Also, another improvement of the present invention preferably includes the receptacle being movable forwardly and rearwardly to and from the window wall within a movable frame while the movable frame remains stationary, and forward and rearward movement of the movable frame and receptacle through the wall outwardly to and from the customer accessible position while the receptacle remains stationary relative to and at the forward end of the movable frame. Further, the movable frame is retained stationary during movement of the receptacle relative thereto, and the receptacle is retained stationary relative to the movable frame during movement of the movable frame all by a single automatically operable latch means. The latch means includes a reciprocally movable latch member mounted on the movable frame trapping a latch pin on a stationary frame and retaining the movable frame stationary during the movement of the receptacle relative to the movable frame, and the same reciprocal latch member releasing the stationary frame latch pin and trapping a latch pin on the receptacle retaining the receptacle stationary relative to the movable frame during the movement of the movable frame. The latch means may also include a movable safety member automatically movable into two positions interfering with one of the frame and receptacle latch pins when the other of the latch pins is trapped by the latch member and until the trapped latch pin is released by the latch member. This safety member thereby prevents the simultaneous trapping of both of the stationary frame and receptacle latch pins by the latch member.

Figure 2:
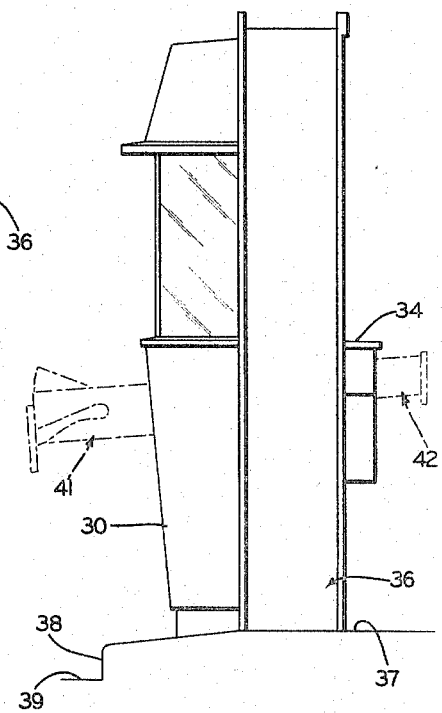
Figure 3:
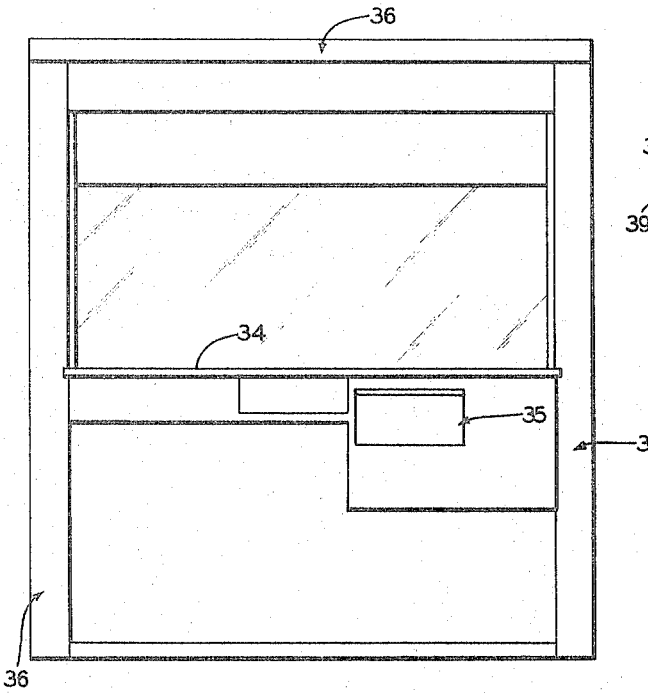

By way of example, the embodiment of the improved bank drive-up window and deal drawer construction of the present invention is illustrated in the accompanying drawings forming a part hereof, wherin like numerals indicate similar parts throughout the several views, and in which:

FIG. 1 is a front elevation of a bank drive-up window incorporating the improvements of the present invention and looking from the customer's side toward the teller's side;

FIG. 2, a side elevation of the bank drive-up window of FIG. 1 and showing the window mounted at curb level according to certain of the improvements of the present invention;

FIG. 3, a rear elevation of the bank drive-up window of FIG. 1 looking from the teller's side toward the customer's side;

FIG. 4, an enlarged top plan view of the deal drawer assembly removed from the bank drive-up window of FIG. 1 and incorporating the improvements of the present invention, with the main movable frame and receptacle moved forwardly extending from the stationary frame;

FIG. 5, a sectional view, part in elevation, looking in the direction of the arrows 5—5 in FIG. 4;

Figure 6:
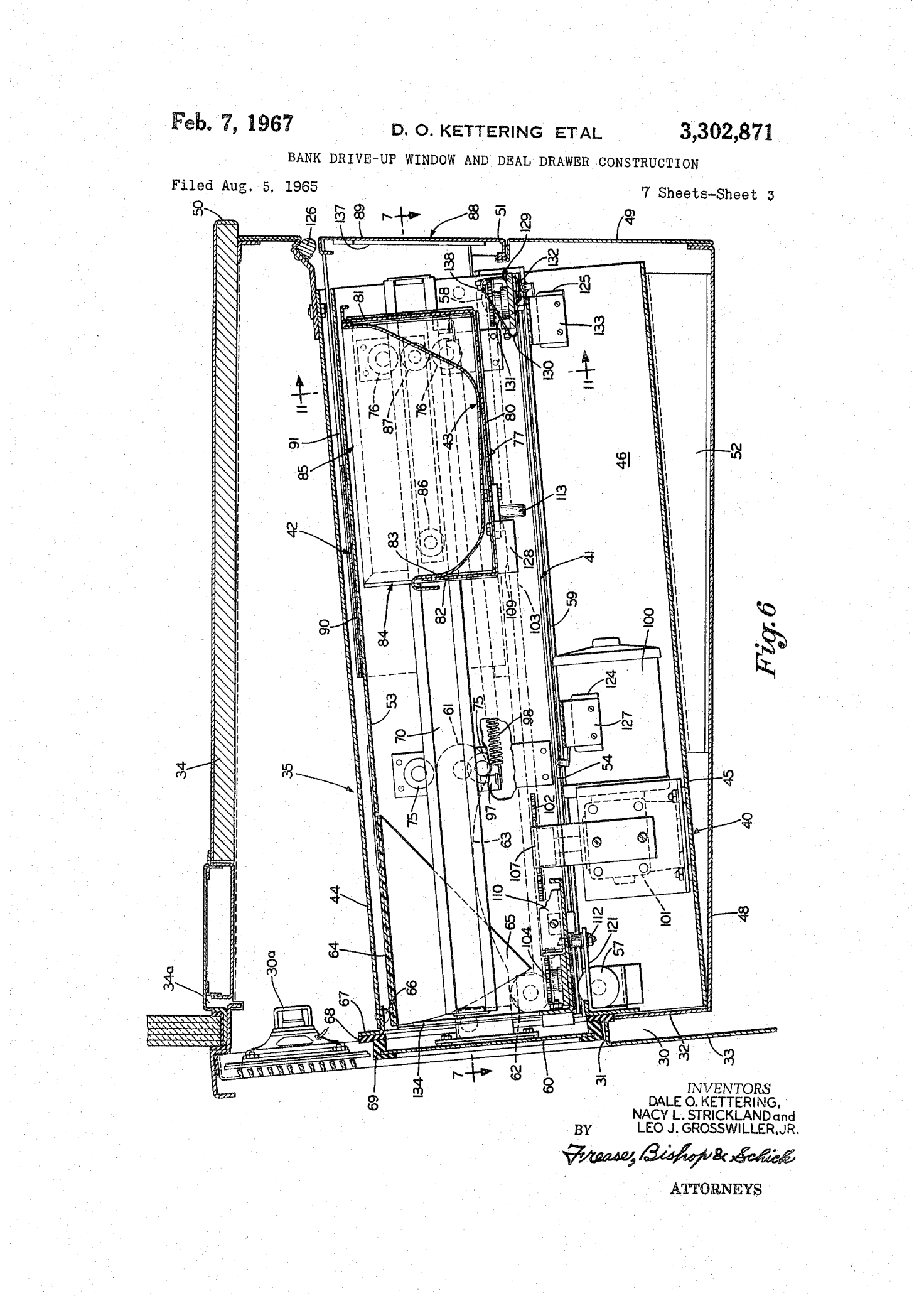

FIG. 6, an enlarged fragmentary vertical sectional view, part in elevation and with parts broken away, taken through the drive-up window and deal drawer of FIG. 1 and looking in the direction of the arrows 6—6 in FIG. 7;

FIG. 7, a fragmentary sectional view with parts broken away and parts in elevation, looking in the direction of the arrows 7—7 in FIG. 6;

FIG. 8, an enlarged fragmentary sectional view, part in elevation, looking in the direction of the arrows 8—8 in FIG. 7;

FIG. 9, an enlarged fragmentary sectional view, part in elevation, looking in the direction of the arrows 9—9 in FIG. 7;

FIG. 10, a fragmentary sectional view, part in elevation, taken from FIG. 6 and showing the receptacle and auxiliary movable frame extended rearwardly from the main movable frame and stationary frame;

FIG. 11, an enlarged fragmentary sectional view, part in elevation, looking in the direction of the arrows 11—11 in FIG. 6;

FIG. 12, a fragmentary sectional view with parts broken away and parts in section, taken from FIG. 7 but with the receptacle moved forwardly within the main movable frame with the latch pin on the receptacle just beginning to engage the latch member;

FIG. 13, a view similar to FIG. 12, but showing the receptacle moved further forwardly and the receptacle latch pin engaged with the latch member at an intermediate position;

FIG. 14, a view similar to FIG. 12, but showing the receptacle moved to complete forward position in the main movable frame and the receptacle latch pin engaged and trapped by the latch member, locking the receptacle and main movable frame for movement together;

FIG. 15, an enlarged fragmentary sectional view, part in elevation, looking in the direction of the arrows 15—15 in FIG. 12 and showing the latch pin on the stationary frame trapped behind the latch member retaining the main movable frame stationary relative to the stationary frame with the receptacle and receptacle latch pin in the positions of FIG. 12;

FIG. 16, a view similar to FIG. 15, but looking in the direction of the arrows 16—16 in FIG. 13 with the stationary frame latch pin still trapped behind the latch member and still retaining the main movable frame stationary relative to the stationary frame with the receptacle and receptacle latch pin in the positions of FIG. 13;

FIG. 17, a view similar to FIG. 15, but looking in the direction of arrows 17—17 in FIG. 14 and showing the latch pin on the stationary frame released from the latch member and the receptacle and receptacle latch pin in the positions of FIG. 14;

FIG. 18, a fragmentary sectional view, part in elevation, and with parts broken away, looking in the direction of the arrows 18—18 in FIG. 16;

FIG. 19, a view similar to FIG. 18, but looking ni the direction of the arrows 19—19 in FIG. 17;

FIG. 20, an enlarged perspective view of the latch member removed from the deal drawer assembly;

FIG. 21, a somewhat diagrammatic horizontal sectional view, part in elevation, illustrating the chain-sprocket drive means for the deal drawer assembly with the receptacle positioned extending rearwardly from the main movable frame and stationary frame;

FIG. 22, a view similar to FIG. 21, but with the receptacle intermediate the main movable frame and stationary frame; and FIG. 23, a view similar to FIG. 21, but showing the receptacle and main movable frame in forwardly extended position from the stationary frame.

Referring particularly to FIGS. 1 through 3, 6 and 7, the bank drive-up window of the present invention is generally of the usual bay-window type having the front upright window wall 30 through which is formed the deal drawer opening 31 between the inner and outer sides 32 and 33 thereof. Further, a generally horizontally extending teller's counter 34 is mounted projecting rearwardly from the window wall 30 beneath which is mounted the improved deal drawer assembly of the present invention and generally indicated at 35.

The drive-up window is otherwise formed with the usual structural members, generally indicated at 36, for mounting the window in the wall of a bank, and may have the usual voice transmission system including the speaker 30a, as well as the usual window defroster 34a in counter 34. According to the principles of the present invention, however, and shown in FIG. 2, due to the particular preferred construction of the deal drawer assembly 35, this window may be mounted on a generally horizontal surface 37 at curb level so that the window and customer's automobile may be separated by the curbing 38, the customer's automobile positioned on the surface level 39, and the teller positioned at or above curb level, that is, at or above the level of the surface 37, all of which will be discussed later more in detail.

As shown particularly in FIGS. 4 through 7, 10 and 11, the deal drawer assembly 35 includes a stationary frame, generally indicated at 40, a first or main movable frame, generally indicated at 41, a second or auxiliary movable frame, generally indicated at 42, and a deal tray or receptacle, generally indicated at 43. All of the frames 40, 41 and 42, and the receptacle 43, are fabricated from the usual sheet metal and other materials and fasteners as appropriate.

The stationary frame 40 is generally box-like in configuration and includes the vertically spaced upper and lower walls 44 and 45 and laterally spaced side walls 46 and 47. Furthermore, this stationary frame 40 is mounted spaced beneath the teller's counter 34 on a lower horizontal supporting wall 48 extending rearwardly from the window wall 30 with this supporting wall 48 being connected rearwardly to an upright rear counter wall 49. The rear counter wall 49 extends upwardly and is secured to the teller's counter 34 spaced slightly forwardly of the counter rear edge 50 and, as best seen in FIGS. 6 and 10, is formed with a receptacle opening 51 therethrough.

Particularly important to certain of the principles of the present invention, and shown in FIG. 6, the stationary frame 40 is mounted on the lower supporting wall 48 resting on the angled supporting members 52 with the forward end of the stationary frame at the lower supporting wall 48 adjacent the inner side 32 of the window wall 30 and with the rearward end of the stationary frame spaced above the lower supporting wall 48, spaced slightly forwardly of the upright rear counter wall 49. Thus, the entire stationary frame 40, including the upper and lower walls 44 and 45 thereof, angles progressively and uniformly downwardly at preferably approximately a 5° angle as this stationary frame extends forward or from the rear counter wall 49 toward and to the window wall 30, for a purpose to be hereinafter discussed in detail.

The first or main movable frame 41 is also formed generally box-like in configuration including the upper and lower walls 53 and 54 and the side walls 55 and 56, and is supported forwardly and rearwardly movable, telescoped within the upper portion of the stationary frame 40 by the stationary frame rollers 57 and the main movable frame rollers 58. The stationary frame rollers 57 are mounted on the stationary frame side walls 46 and 47 rotatably supporting lower wall 54 of the main movable frame 41, while the main movable frame rollers 58 are rotatably supported at the lower rear corners of the side walls 55 and 56 of the main movable frame 41 and are supported within the forwardly and rearwardly extending roller tracks 59 mounted on the side walls 46 and 47 of the stationary frame 40.

Thus, the main movable frame 41 is supported for forward and rearward movement relative to the stationary frame 40 and is aligned with the deal drawer opening 31 of the window wall 30 for movement through this opening between a rearward position with the forward end thereof at and adjacent the window wall 30 and the rearward end thereof adjacent the rear counter wall 49, as to be fully telescoped within the stationary frame 40, as shown in FIG. 6, and a forward position moved forwardly relative to the stationary frame 40 and extending through the deal drawer opening 31 of the window wall 30 with the forward end thereof spaced outwardly of the outer side 33 of window wall 30 and the rearward end thereof intermediate the length of the stationary frame, as illustrated in FIG. 2 in broken lines and FIGS. 4 and 5 in full lines.

Again, due to the angled positioning of the stationary frame 40 as described above, and the fact that the roller tracks 59 on the stationary frame supporting rollers 58 on the main movable frame are mounted on the stationary frame parallel to the upper and lower walls 44 and 45 of the stationary frame, the main movable frame in its forward and rearward movement will move downwardly in its outward movement and upwardly in its inward movement progressively and uniformly along the same angling as the mounting of the stationary frame 40.

An upright front end member 60 is vertically movably mounted across the forward end of the main movable frame 41 by means of a pair of cam pivot arms 61 pivotally connected to the front end member extending rearwardly along side walls 55 and 56 of the main movable frame and pivotally connected to these side walls spaced rearwardly from the front end member. Appropriate cam rollers 62 are mounted on the side walls 46 and 47 of the stationary frame 40 positioned for engaging the lower cam surfaces 63 of the cam pivot arms 61 when the main movable frame 41 is moved rearwardly through the deal drawer opening 31 of window wall 30 toward the rearward position of the main movable frame 41 relative to the stationary frame 40.

These lower cam surfaces 63 on the cam pivot arms 61 are formed so that as the main movable frame 41 moves toward rearward position and rearwardly relative to the stationary frame 40, the cam roller 62 on the stationary frame will pivot these cam pivot arms and the front end member 60 upwardly from the lowered position shown in FIG. 5, to the raised position shown in FIG. 6. In this raised position, the front end member 60 is aligned with and closes the front end of the main movable frame 41 and is received within and closing the deal drawer opening 31 of the window wall 30. Furthermore, these cam rollers and cam surfaces similarly control the movement of the front end member 60 downwardly from the raised position shown in FIG. 6, to the lowered position shown in FIG. 5, during the outward movement of the main movable frame 41 relative to the stationary frame 40 outwardly through the deal drawer opening 31 in window wall 30.

As shown in FIGS. 4, 5 and 6, the upper wall 53 of the main movable frame 41 terminates forwardly spaced from the forward end of this main movable frame in a preferably transparent receptacle cover 64. Receptacle cover 64 is pivotally attached to the front edge of upper wall 53 and extends to the forward end of the main movable frame and is spring loaded for pivotal movement to an upwardly angled open position as shown in FIG. 5. Further, this receptacle cover 64 may have the side flanges 65 and is forced downwardly to a lower closed position generally aligned with the upper wall 53 of the main movable frame 41 by the rollers 66 mounted at the forward end of the stationary frame 40.

Thus, as the main movable frame 41 moves outwardly relative to the stationary frame 40 and outwardly through the deal drawer opening 31 in window wall 30, the receptacle cover 64 is progressively released from the roller 66 and is spring urged pivotally upwardly to the upwardly angle open position shown in FIG. 5. When the main movable frame 41 moves rearwardly through the deal drawer opening 31, the rollers 66 ultimately engage this receptacle cover 64 and progressively force the receptacle cover against the spring urging to the downward closed position shown in FIG. 6.

As best seen in FIGS. 4, 5 and 6, the forward end of the stationary frame 40 is formed with a flange 67 around and aligned with the deal drawer opening 31 of the window wall 30, and a resilient material cushion 68 is mounted on this flange facing forwardly and in interference with the extremities of the deal drawer opening 31. The front end member 60 on the main movable frame 41 is edged with a resilient material bumper 69 covering a portion of the front surface of this front end member as well as projecting slightly rearwardly therefrom. Thus, when the main movable frame 41 moves to its rearward position with the front end member 60 closing the deal drawer opening 31, the bumper 69 of the front end member engages the cushion 68 of the stationary frame 40 as shown in FIG. 6, and when the main movable frame 41 moves forwardly through the deal drawer opening 31, the bumper 69 on the front end member 60 protects this front end member, as well as the customer's automobile, in the event contact should be made therebetween.

The second or auxiliary movable frame 42 is formed by the receptacle supporting track members 70 and 71 positioned inwardly of the side walls 55 and 56 of the main movable frame 41 and of substantially equal length to the main movable frame. The receptacle supporting track members 70 and 71 are substantially identically formed and merely oppositely deposed with each being formed with the upper and lower flanked roller tracks 72 and 73 and the inwardly opening track 74, as best seen in cross-section in FIG. 11 and in elevation in FIGS. 6 and 10.

Furthermore, these receptacle supporting track members 70 and 71 are supported inwardly adjacent the side walls 55 and 56, respectively, of the main movable frame 41 by vertically spaced pairs of forward rollers 75 and rearward rollers 76, which rollers are rotatably mounted on the inner surfaces of the side walls 55 and 56 of the main movable frame 41. Also, these rollers 75 and 76 engage downwardly and upwardly into the upper and lower flanged roller tracks 72 and 73 of the track members 70 and 71 so as to support these track members rearwardly and forwardly movable between the forward position shown in FIG. 6 in which these track members extend substantially the length of the main movable frame 41, and the rearward position as shown in FIG. 10 in which these track members project rearwardly from the rearward end of the main movable frame 41 and rearwardly of the rear counter wall 49 and teller's counter rear edge 50.

Again, it will be noted that the receptacle supporting track members 70 and 71 are supported by the rollers 75 and 76 on and movable as described relative to the main movable frame 41 in positions substantially parallel to the movement of the main movable frame, as well as the support of the upper and lower walls 44 and 45 of the stationary frame 40. Thus, the track members 70 and 71 forming the auxiliary movable frame 42 are supported positioned and forwardly and rearwardly movable in the same progressively uniform downward angling from the rearward end to the forward end as the supporting and forward and rearward movement of the main movable frame 41 and the mounting or supporting of the stationary frame 40.

The deal tray or receptacle 43 is formed by an outer shell 77 having the side walls 78 and 79, the lower wall 80, the rear wall 81 and the modified forward wall 82 so as to be box-like in configuration and opening upwardly and partially forwardly. The rear wall 81 of this outer shell 77 extends upwardly to nearly the upper wall 53 of the main movable frame 41 when the receptacle is positioned within this main movable frame, and the forward wall 82 of this outer shell 77 terminates spaced downwardly from this upper wall 53 of the main movable frame. An inner tray portion 83 is telescoped within the outer shell 77 and conforms substantially to the outer shell with the exception of the usual contouring of the rear and forward walls thereof making articles contained therein more accessible for convenient removal.

The receptacle 43, therefore, considered separately from the main movable frame 41, has a partial front opening 84, a complete upper opening 85 and is otherwise closed by the various walls. Further, the receptacle 43 is mounted forwardly and rearwardly movable within the receptacle supporting track members 70 and 71 by spaced forward and rearward rollers 86 and 87 rotatably secured to the outer shell side walls 78 and 79 of the receptacle and received in the inwardly opening roller tracks 74 of the receptacle supporting track members 70 and 71, as best seen in FIGS. 6, 10 and 11.

Thus, when the receptacle supporting track members 70 and 71 forming the auxiliary movable frame 42 are in the forward positions relative to the main movable frame 41 as shown in FIG. 6, the receptacle 43 is movable between the forward and rearward ends of the main movable frame. At the same time, due to the roller mounting of the receptacle supporting track members 70 and 71 forwardly and rearwardly movable relative to the main movable frame 41, the receptacle 43 may move rearwardly beyond the main movable frame through extension of these receptacle supporting track members rearwardly from the main movable frame, all of which will be discussed later to a greater extent.

A rear shield member, generally indicated at 88, and shown in broken lines in FIG. 2 as well as full lines in FIGS. 4 through 7, 10 and 11, is positioned telescoped within the stationary frame 40 and over the main movable frame 41 at the rearward portions of these frames. Furthermore, this shield member 88 is formed with an upright rear end member 89, the upper wall 90 having the receptacle access opening 91 forwardly of the rear end member 89, and the side walls 92 and 93.

Sield member 88 is mounted for forward and rearward movement relative to the stationary and main movable frames 40 and 41 through the generally L-shaped foot portions 94 received in the U-shaped track members 95 secured overlying the roller tracks 59 on stationary frame 40, as best seen in FIG. 7 in elevation and FIG. 11 in cross-section. Also, the spring brackets 96 are formed on the inner sides of the side walls 92 and 93 of shield member 88 with similar spring brackets 97 being formed spaced forwardly on the side walls 46 and 47 of the stationary frame 40. Usual coil tension springs 98 are engaged between these brackets 96 and 97.

Thus, shield member 88 is normally spring-urged forwardly with the side walls 92 and 93 thereof substantially fully telescoped with the stationary and main movable frames 40 and 41 and with the shield rear end member 89 closing the receptacle opening 51 in the rear counter wall 49. Due to the slidable and spring mounting thereof as described, however, this shield member 88 may be urged rearwardly relative to the stationary and main movable frames 40 and 41, and so that the rear end member 89 will be spaced rearwardly from the receptacle opening 51 in the rear counter wall 49, all of which will be described later as it relates to the operation of the deal drawer assembly 35.

The deal drawer driving assembly, generally indicated at 99, is best seen in FIGS. 5 through 9, and 11, and is diagrammatically illustrated in FIGS. 21 through 23. This driving assembly includes the electric drive motor 100 operably connected through the usual slip clutch to the gear reduction unit 101 which in turn mounts the driving sprocket or pinion 102.

As can be seen, the gear reduction unit 101 mounts the driving pinion 102 generally horizontally with this pinion being operably engaged with the endless drive chain 103. Drive chain 103, in turn, is mounted extending forwardly and rearwardly over the forward driven sprocket 104 and rear driven sprocket 105, which driven sprockets are rotatably mounted on and overlying the lower wall 54 of the main movable frame 41 and underlying the path of travel forwardly and rearwardly of the receptacle 43. In this respect, it will be noted that the lower wall 54 of the main movable frame 41 is primarily formed merely by relatively narrow sections at the forward and rearward ends of this movable frame so that the space therebetween constituting the major extent of the movable frame is open permitting the stationary placement, although rotatable, of the driving pinion 102 without interference to the movement of the main movable frame with respect to the stationary frame 40.

As best seen in FIGS. 7 and 8, a nylon chain keeper 106 is mounted through a bracket 107 on the lower walls 45 of the stationary frame 40 with this chain keeper 106 being engaged against the drive chain 103 forcing the chain against and keeping the same engaged with the driving pinion 102. The purpose of this keeper 106 is to prevent disengagement between the drive chain 103 and driving pinion 102 despite slack being created in the drive chain by fast changes in directions of movement, as well as fast stopping of such movement.

The drive from the drive chain 103 is transmitted to the receptacle 43 through drive pins 108 secured to chain 103 and received in a drive block 109 secured to the outer shell lower wall 80 of receptacle 43, as best seen in FIGS. 6, 7 and 9. That is to say, the entire drive for the main movable frame 41, auxiliary movable frame 42 and receptacle 43 is directly from the drive chain 103 to the receptacle, and through this receptacle to these movable frames, as well as the shield member 88.

Although it will be more clearly understood from the later detailed description of the sequence of operation and movement of the various parts of this deal drawer assembly 35, when the main movable frame 41 and auxiliary movable frame 42 are retained stationary in the stationary frame 40, as shown for instance in FIGS. 6, 7 and 22, rotation of the driving pinion 102 moves the drive chain 103 around the forward and rear driven sprockets 104 and 105 and with these driven sprockets rotating, so that the receptacle 43 is moved forwardly and rearwardly within the stationary frame 40 and main movable frame 41, and along the receptacle supporting track members 70 and 71 forming the auxiliary movable frame 42, so that the drive chain 103 during this period of movement of the receptacle acts as a conventional driving chain moving relative to the main movable frame upon which it is mounted. Furthermore, this is true during movement of the receptacle 43, auxiliary movable frame 42 and shield member 88 through the receptacle opening 51 of the rear counter wall 49, as best seen in FIGS. 10 and 21, since the connection of drive chain 103 through drive pins 108 and drive block 109 to the receptacle 43 is at the forward edge of this receptacle.

When, however, the receptacle is fully at the forward end of the main movable frame 41 and is carried outwardly through the deal drawer opening 31 toward the customer's side of the window wall 30 by the main movable frame, this movement is produced by the forward and rear driven sprockets 104 and 105 remaining stationary, so that the drive chain 103 remains stationary relative to the main movable frame and acts as a rack for drive by the driving pinion 102, as best seen in FIGS. 14 and 23. In this manner, an extremely simplified drive is provided driving the receptacle 43 through a large over-all range of movement, that is, from the one extreme of extending a distance outwardly to the customer's side of the window wall 30, inwardly through the deal drawer opening 31, completely through the stationary frame 40 beneath the teller's counter 34, and to the opposite extreme of projecting rearwardly through the receptacle opening 51 in the rear counter wall 49 and rearwardly of the rear edge 50 of the teller's counter 41, all of which will be described further in proper sequence.

A latch assembly, generally indicated at 110, is secured to the lower wall 54 of the main movable frame 41 spaced from the forward edge thereof, and this latch assembly is for the alternate purpose of either locking the main movable frame 41 stationary relative to the stationary frame 40 with the front end member 60 of the main movable frame closing the deal drawer opening 31 in the window wall 30 while the receptacle 43 moves forwardly and rearwardly in the main movable frame and rearwardly outwardly through the receptacle opening 51 in the rear counter wall 49, or for locking the receptacle at the front end of the main movable frame during outward and inward movement of the main movable frame through the deal drawer opening 31 to and from the customer's side of window wall 30. Further, the latch assembly 110 primarily includes a spring-loaded receptacle latch member 111, a stationary frame latch pin 112, a receptacle latch pin 113 and a safety interference pin 114.

The latch member 111 is mounted inwardly adjacent the side wall 56 of the main movable frame 41 spring-urged away from this side wall by the compression spring 115 and received in a rectangular opening 116 in the lower wall 54 of the main movable frame 41 spaced slightly rearwardly of the forward extremities of this main movable frame. Furthermore, this latch member 111 is retained reciprocally movable in the opening 116 by the mounting plates 117 secured to the lower wall 54 and received edgewise in the mounting slots 118 of the latch member as shown, for instance, in FIGS. 18 and 19, with the latch member 111 being shown removed from the assembly in FIG. 20.

Due to this particular mounting of the latch member 111 by these mounting plates 117, the latch member extends partially above and partially below the lower wall 54 of the main movable frame 41 and is formed with an upper angled latch surface 119 and a lower angled latch surface 120. The receptacle latch pin 113 is secured extending downwardly from the outer shell lower wall 80 of the receptacle 43 forwardly and rearwardly aligned and of appropriate vertical length so as to engage the upper angled latch surface 119 of latch member 111 when the receptacle approaches the forward end of the main movable frame 41. The stationary frame latch pin 112 is secured through an L-shaped bracket 121 to the stationary frame 40 forwardly and rearwardly aligned and of appropriate vertical length for engagement with the lower angled latch surface 120 of latch member 111 when the main movable frame 41 moves inwardly through the deal drawer opening 31 of window wall 30 and the front end member 60 of this main movable frame is closely approaching the closing of the deal drawer opening 31.

Although again, the operation of this latch assembly 110 will be more clearly understood and described during the description of the sequence of movement of the various parts of the deal drawer assembly 35, the operation of the latch member 111 serves to trap each of the stationary frame latch pin 112 and receptacle latch pin 113, although only one of these latch pins at any particular moment, forward of the latch member front surface 122. Thus, the latch member 111 serves the dual latching purpose of trapping the stationary frame latch pin 112 behind the front surface 122 retaining the main movable frame 41 immovable relative to the stationary frame 40 during forward and rearward movement of the receptacle 43 within the main movable frame, or of trapping the receptacle latch pin 113 behind the front surface 122 retaining the receptacle immovable relative to the main movable frame during movement of this main movable frame outwardly and inwardly through the deal drawer opening 31 and relative to the stationary frame.

In order to insure that only one of the stationary frame and receptacle latch pins 112 and 113 is trapped by the latch member 111 at any one time, the safety interference pin 114 is mounted extending upwardly from a resilient mounting strip 123 secured to the lower wall 54 of the main movable frame 41. This safety interference pin 114 is positioned movable upwardly and downwardly adjacent the latch member front surface 122 and forwardly and rearwardly aligned with the stationary frame and receptacle latch pins 112 and 113.

The resilient mounting strip 123 normally urges this safety interference pin 114 upwardly into a position interfering with the trapping of the receptacle latch pin 113 by the latch member 111, and pin 114 cannot move downwardly as long as the stationary frame latch pin 112 is entrapped by the latch member 111. When, however, the stationary frame latch pin 112 is not fully in trapped position, the receptacle latch pin 113 may move forwardly into entrapment by the latch member 111, at the same time, engaging the safety interference pin 114 and forcing this safety interference pin downwardly. The downward movement of the safety interference pin is, of course, now permitted by the freedom from restriction by the stationary latch pin 112.

For the main part, the electrical control system of the deal drawer assembly 35 of the present invention is of usual and standard construction and it is only necessary to state that the usual control switches, limit switches, various safety switches and other electrical and electronic elements are provided. For purposes of this present description, only the forward and rearward stop switches 124 and 125 are described, the various actuating means therefor and the safety bar 126.

As is shown in broken lines in FIG. 2 and in full lines in FIGS. 4, 5 and 10, the two extremes of movement of the receptacle 43 are forwardly through the deal drawer opening 31 of window wall 30 with the main movable frame 41, and rearwardly through the receptacle opening 51 in the rear counter wall 49 on the auxiliary movable frame 42 and with shield member 88. Thus, the drive motor 100 must be stopped at the end of travel of the receptacle 43 to these two extremes, considering that the drive motor 100 is normally operated for movement of the receptacle in either direction by the teller through a usual hand switch, not shown.

The extreme rearward movement of the receptacle 43 and the auxiliary movable frame 42 is limited from the standpoint of stopping the drive motor 100 by a switch actuating block 128 secured to the outer shell lower wall 80 of receptacle 43 engaging the rearward stop switch 125 through a unique switch actuating assembly, generally indicated at 129, as best seen in FIGS. 6, 7 and 10. The rearward stop switch 125 is mounted forwardly and rearwardly aligned with both the block 128 and assembly 129 by the bracket 133 secured to the stationary frame side wall 47. Switch actuating assembly 129 is formed by a generally triangular, resilient strip, switch actuating member 130 having an angled block engaging portion 131 and a switch engaging foot portion 132.

As shown, the switch actuating member 130 is mounted on the extreme rearward part of the lower wall 54 on the main movable frame 41 rearwardly aligned with the switch actuating block 128 on receptacle 43. Furthermore, this switch actuating member 130 is positioned so that when the receptacle 43 reaches the rearmost position extending rearwardly through the receptacle opening 51 of the rear counter wall 49, switch actuating block 128 will engage the angled block engaging portion 131 of switch actuating member 130, forcing this portion downwardly and thereby forcing the switch engaging foot portion 132 of switch actuating member 130 downwardly to engage the rearward stop switch 125, that is, into the position shown in FIG. 10.

Thus, the rearward stop switch 125 is engaged for stopping the drive motor 100 through a unique motion-transfer means in the form of the switch actuating assembly 129, so that the actuating motion of the receptacle 43 is transferred through the main movable frame 41 to the rearward stop switch 125 on the stationary frame 40 by means of the switch-actuating member 130. The actual rearward motion of the receptacle 43 is stopped by an appropriate bumper to be described later in the description of the sequential operation of the deal drawer assembly 35 of the present invention.

Still referring to FIGS. 6 and 7, the extreme forward movement of the receptacle 43 and of main movable frame 41 is limited from the standpoint of stopping the drive motor 100 by the forward stop switch 124 mounted on a bracket 127 secured to the stationary frame side wall 47. This forward stop switch 124 is forwardly aligned and positioned engageable by the switch engaging foot portion 132 of switch actuating member 130 when this switch actuating portion merely moves over the forward stop switch, that is, without the necessity of this switch actuating member 130 being engaged by he switch actuating block 128. Thus, when the receptacle 43 and main movable frame 41 reach the outermost customer accessible position extending from the outer side 33 of window wall 30, as shown in broken lines in FIG. 2 and full lines in FIGS. 4 and 5, the switch actuating member 130 engages the forward stop switch 124 stopping the drive motor 100. Again, the actual stopping or limiting of movement of the receptacle 43 and main movable frame 41 at this extreme forward position is accomplished by appropriate bumpers which will be discussed more in detail later.

The safety bar 126 is best seen in FIGS. 4, 5 6 and 10 and is mounted on the upper wall 44 of stationary frame 40 at and extending across the receptacle opening 51 of the rear counter wall 49, thereby positioning this safety bar 126 directly above the upper edge of the rear end member 89 on shield member 88 when this shield member is fully telescoped within the stationary frame 40 and closing receptacle opening 51. This safety bar 126 is of a usual form which will break an electrical circuit when engaged by a solid object and is operably connected into the electrical system with the drive motor 100 for this purpose. Thus, during the forward movement of the receptacle 43 and shield member 88 from the extreme rearward position, as shown in FIG. 10, to the forward position in which the receptacle continues to move forwardly and the shield member closes receptacle opening 51 in rear counter wall 49, if there is an obstruction, such as objects projecting upwardly from the receptacle or the teller's hand in a position of interference, the particular interfering object will be forced by the forward motion of the receptacle and shield member against safety bar 126, causing the safety bar to interrupt the electrical circuit to the drive motor 100, and thereby stopping this drive motor and the forward motion of the receptacle and shield member.

As previously stated, the electrical control system for the deal drawer assembly 35 includes the usual control switches, limit switches, various safety switches and other electrical and electronic elements including those just described. Also, as previously stated, the actual movement of the receptacle 43 forwardly and rearwardly is selectively controlled by a hand switch operated by the teller.

It has been found from experience that virtually all of the failures in deal drawer constructions in the electrical systems occur in these various switches and other somewhat complex electrical and electronic elements, and that such failures usually are not occasioned by the relatively fool-proof reversible drive motors. For this reason, it is preferred to form the electrical control system of the deal drawer assembly 35 of the present invention arranged so that, although the movement of the receptacle 43 is normally controlled not only through the teller's hand switch but the other usual switches and electrical and electronic elements, if a failure should occur in the electrical control system other than a complete loss of electrical power, the control of the drive motor 100 can be quickly converted solely to the control by the teller's hand switch, circumventing all of these other usual switches and electrical and electronic elements. In this manner, it is possible to operate the receptacle 43 on a direct emergency basis during most failures in the electrical control system.

In considering the sequential operation of the deal drawer assembly 35 of the present invention, assume that the receptacle 43 is positioned near the rearward end of the main movable frame 41 and beneath the teller's counter 34, as shown in FIGS. 6, 7 and 11. In this position, the main movable frame 41 is fully telescoped within the stationary frame 40 beneath the teller's counter 34 with the front end member 60 of this main movable frame closing the deal drawer opening 31 in window wall 30 and with the rear end member 89 of shield member 88 closing the receptacle opening 51 in the rear counter wall 49 by virtue of the shield member being also fully telescoped within the stationary frame 40 and over the main movable frame 41.

A customer then arrives at the outer side 33 of the window wall 30, and the teller operates the teller's hand switch to move the receptacle 43 forwardly in order to ultimately provide access thereto by the customer. Operation of the teller's hand switch actuates the drive motor 100 which begins rotation of the driving pinion 102, in turn moving the drive chain 103 by rotation of the forward and rear driven sprockets 104 and 105 relative to the main movable frame 41.

This begins forward movement of the receptacle 43 relative to both the main movable frame 41 and stationary frame 40, and such movement is along the receptacle supporting track members 70 and 71 forming the horizontally movable frame 42. At this time, the main movable frame 41 is retained stationary by virtue of the latch member 111 being engaged with and trapping the stationary frame latch pin 112 while the receptacle supporting track members 70 and 71 forming the horizontally movable frame 42 are retained against forward movement by abutment of the forward ends thereof against appropriate bumpers 134 mounted at the front edges of the main movable frame side walls 55 and 56, as best seen in FIGS. 6 and 7.

This relative movement of the receptacle 43 to the main movable frame 41 by movement of the drive chain 103 relative to this main movable frame is illustrated diagrammatically in FIG. 22.

As the receptacle 43 aproaches the forward end of main movable frame 41 and stationary frame 40, the receptacle latch pin 113 engages the upper angled latch surface 119 on latch member 111, as shown in FIGS. 12 and 15, so that continued forward movement of the receptacle forces the latch member to slide against the resilient urging of the compression spring 115 and thereby cease entrapment of the stationary frame latch pin 112 behind the latch member front surface 122. As soon as the latch member 111 disengages the stationary frame latch pin 112, the main movable frame 41 immediately begins forward movement so that the latch member 111 begins movement forwardly past the stationary frame latch pin 112, while at the same time, the receptacle latch pin 113 is moving forwardly past the latch member 111, all of which takes place virtually instantaneously and to a great extent as a result of the forward momemtum of the receptacle 43.

This sequence of unlatching the stationary frame latch pin 112 and the latching of the receptacle latch member 111 is shown starting in FIGS. 12 and 15 wherein the receptacle latch pin 113 is just engaging the latch member upper angled latch surface 119 and the stationary frame latch pin 112 is still trapped behind the latch member front surface 122, further in FIGS. 13 and 16 wherein the receptacle latch pin 113 is beginning to pass latch member 111 although the stationary frame latch pin 112 is still in the same position relative to the latch member but with the latch member withdrawn as forced by the receptacle latch pin 113, and finally in FIGS. 14 and 17 wherein the main movable frame 41 has begun to move forwardly with the latch member 111 moving forwardly away from the stationary frame latch pin 112 and the receptacle latch pin 113 having forced the safety interference pin 114 downwardly and released latch member 111 engaging behind the latch member front surface 122. Thus, at this point, the latch assembly 110 releases the main movable frame 41 from the stationary frame 40 and at the same time latches the receptacle 43 at the forward end of this main movable frame.

Also, at the same time, the actual forward motion of the receptacle 43 relative to the main movable frame 41 is stopped by the receptacle latch pin 113, after entrapment behind the front surface 122 of the latch member 111, striking the bumper 135 on the main movable frame, as shown for instance in FIG. 17. Still further at this point, in view of the relative movement between the receptacle 43 and main movable frame 41 being stopped, movement of the drive chain 103 around the rotating forward and rear driven sprockets 104 and 105 is stopped, so that the movement of drive chain 103 relative to the main movable frame 41 ceases although the driving pinion 102 continues to rotate. The drive chain, therefore, begins to act as a rack beginning to move the main movable frame outwardly through the deal drawer opening 31 in window wall 30 and relative to the stationary frame 40.

This outward movement of the receptacle 43 and main movable frame 41 relative to the stationary frame 40 by virtue of the fact that the drive chain 103 is retained stationary relative to the main movable frame and acts as a rack for being driven by the driving pinion 102 is illustrated diagrammatically in FIG. 23.

As the main movable frame 41 continues the forward or outward movement with the receptacle 43 located in the front end portion thereof, the front end member 60 including the cam pivot arms 61 moves outwardly relative to the stationary frame cam rollers 62, as best seen in FIGS. 4 and 5, so that the lower cam surfaces 63 on these cam pivot arms 61 move along cam rollers 62 and the front end member 60 is gradually lowered providing front access above the front end member into receptacle 43. Also, as the receptacle cover 64 moves forwardly or outwardly relative to the stationary frame rollers 66, this receptacle cover is released for spring urging to the upward angled pivoted position shown in FIG. 5, thereby providing additional front access, as well as at least modified top access, through the main movable frame 41 into the receptacle 43.

To complete the forward or outward movement of the main movable frame 41 and receptacle 43 through the deal drawer opening 31 of window wall 30, the forward movement of the main movable frame ultimately carries the switch engaging foot portion 132 of switch actuating member 130 into engagement with the forward stop switch 124, thereby stopping the drive motor 100. The actual forward motion of the main movable frame 41, and consequently the receptacle 43, is stopped by the main movable frame rollers 58 engaging the bumpers 136 on the stationary frame side walls 46 and 47, the location of such bumpers being best seen in FIG. 7.

After the customer has completed inserting the necessary papers, money etc. into the receptacle 43, the teller again operates the hand teller's switch appropriately for causing the drive motor 100 to begin operation driving the main movable frame 41 and receptacle 43 rearwardly. This rearward movement is just the opposite of the forward movement described, wherein the driving pinion 102 drives the drive chain 103 as a rack in the opposite direction, the front end member 60 of the main movable frame is raised upwardly by the stationary frame cam rollers 62 so as to be aligned with the deal drawer opening 31 in window wall 30, and the receptacle cover 64 is forced downwardly by the stationary frame rollers 66 to complete the closing of the receptacle.

Thus, ultimately the main movable frame 41 becomes again fully telescoped by the stationary frame 40 and the front end member 60 on the main movable frame closes the deal drawer opening 31 in window wall 30. At this moment, the lower angled latch surface 120 of latch member 111 comes into engagement with the stationary frame latch pin 112 and the reverse order of latching takes place virtually simultaneously, that is, the stationary frame latch pin 112 slides back the latch member 111 causing this latch member to disengage the receptacle latch pin 113, and at the same time, entrapping the stationary frame latch pin 112 behind the front surface 122 of this latch member 111.

The main movable frame 41, therefore, is now once again locked stationary in the stationary frame 40 and the receptacle 43 begins rearward movement relative to both the stationary frame and main movable frame. At the same time the drive chain 103 ceases operation as a rack and again begins movement, but in the reverse direction, relative to the main movable frame 41 and around the rotating forward and rear driven sprockets 104 and 105.

During this rearward movement of the receptacle 43, this receptacle is moving within and relative to the auxiliary movable frame 42, or the receptacle supporting track members 70 and 71 forming this auxiliary movable frame. Ultimately the receptacle 43 reaches the rearward end of the auxiliary movable frame 42 forcing the receptacle supporting track members 70 and 71 thereof to begin rearward movement relative to the stationary frame 40 and main movable frame 41, and at about the same time, the receptacle 43 engages the bumper 137 on the rear end member 89 of shield member 88. Thereafter, the still continued rearward movement of the receptacle 43 not only carries the receptacle supporting track members 70 and 71 of the auxiliary movable frame 42 rearwardly relative to the stationary frame 40 and main movable frame 41, but also carries the shield member 88 rearwardly out of the receptacle opening 51 in the rear counter wall 49 and against the forward spring urging of the tension springs 98.

Finally, the receptacle 43 and shield member 88 reach the rearward position shown in FIG. 10 in which the receptacle is projecting rearwardly of the rear counter wall 49, as well as the counter rear edge 50, providing top access for the teller downwardly into the receptacle 43 through the receptacle access opening 91 in the shield member upper wall 90. At this point, the switch actuating block 128 on receptacle 43 engages the switch actuating member 130 causing the switch engaging foot portion 132 thereof to engage the rearward stop switch 125 on the stationary frame 40 and stop the drive motor 100. The actual rearward motion of the receptacle 43 is stopped by the receptacle drive block 109 engaging the bumper 138, the location of such bumper being shown in FIG. 7.

This rearward projection of the receptable 43 on the auxiliary movable frame 42 and rearwardly from the main movable frame 41, as well as the stationary frame 40, is illustrated diagrammatically in FIG. 21. It will be noted that during this rearward projection of the receptacle 43, the drive chain 103 continues to act in the conventional manner, that is, moving relative to the main movable frame 41 and around the forward and rear driven sprockets 104 and 105.

Thus, this unique driving pinion 102 and drive chain 103 arrangement provides movement for the receptacle 43 projecting rearwardly of the main movable frame 41 and stationary frame 40 as well as forward and rearward movement within the main movable frame and stationary frame by movement of the drive chain 103 relative to the main movable frame in a conventional manner, and also provides movement of the receptacle 43 and main movable frame 41 outwardly from and relative to the stationary frame 40 by this drive chain 103 remaining stationary relative to the main movable frame and acting as a rack for being driven by the driving pinion 102. In this manner, a relatively wide range of movement is provided for the receptacle 43 through a greatly simplified driving mechanism.

The forward movement of the receptacle 43 from the rearwardly projecting position shown in FIG. 10 to the counter covered position shown in FIG. 6, or on forwardly, is commenced by the teller operating the hand teller's switch to begin operation again, in the reverse direction, of the drive motor 100. This causes the drive chain 103 to move the in the opposite direction relative to the main movable frame 41 and move the receptacle forwardly. At the same time, the shield member 88 is urged forwardly with the receptacle 43 by the tension springs 98, and this forward movement of the shield member ultimately engages and forces the receptacle supporting track members 70 and 71 of the auxiliary movable frame 42 to move forwardly into the main movable frame 41. Finally, the rear end member 89 of shield member 88 eventually again closes the receptacle opening 51 in the rear counter wall 49.

Thus, according to the principles of the present invention, a bank drive-up window and deal drawer construction is provided in which the receptacle 43 may be selectively moved between extreme positions of projecting outwardly through the deal drawer opening 31 of a window wall 30 to a customer accessible position and projecting rearwardly beyond the rear edge 50 of the teller's counter 34 into a teller accessible position, so that the teller's counter 34 may be free of the usual receptable access openings. Furthermore, the entire movement of the receptacle 43 is at a progressive uniformly downward angle outwardly, and upward angle inwardly, preferably approximately 5° from horizontal, so that the teller may be positioned above the level of the customer's automobile and the customer for greatly improved teller vision.

Still further, during movement of the receptacle 43 within the main movable frame 41 and stationary frame 40 beneath the teller's counter 34, as well as from these frames projecting rearwardly of the teller's counter, the main movable frame 41 is retained locked within the stationary frame 40 with the front end member 60 of the main movable frame closing the deal drawer opening 31 in window wall 30 by a unique latch assembly 110, which latch assembly also performs the dual function of locking the receptacle 43 at the front end of the main movable frame 41 during movement of this main movable frame and receptacle outwardly through the deal drawer opening 31 and relative to the stationary frame 40. To insure foolproof operation, this unique latch assembly 110 includes means in the form of a safety interference pin 114 which prevents the simultaneous locking of the main movable frame 41 in the stationary frame 40 and the receptacle 43 in the main movable frame, so that such locking must be alternate locking and must take place in proper sequence.

Additionally, and still according to the principles of the present invention, a unique and improved driving means in the form of the driving pinion 102 and drive chain 103 is provided for driving the receptacle 43 between the extremes of receptacle movement, with the drive chain operating in conventional manner and moving relative to the main movable frame 41 for driving the receptacle from the rearward extreme of projecting rearwardly from the teller's counter 34 forwardly to the front end of the main movable frame, at which point, the drive chain 103 ceases movement relative to the main movable frame and acts as a rack for driving the receptacle and main movable frame outwardly through the deal drawer opening 31 in the window wall 30.

Finally, a unique switch actuating assembly 129 is provided on the main movable frame 41 for transferring the rearward motion of the receptacle relative to the main movable frame downwardly through the main movable frame to actuate a rearward stop switch 125 on the stationary frame 40.

In the foregoing description, certain terms have been used for brevity, clearness and understaanding but no unnecessary limitations are to be implied therefrom, because such words are used for descriptive purposes herein and are intended to be broadly construed.

Moreover, the embodiment of the improved construction illustrated and described herein by way of example and the scope of the present invention is not limited to the exact details of construction shown.

Having now described the invention, the construction, operation and use of the preferred embodiment thereof, and the advantageous new and useful results obtained thereby, the new and useful construction and reasonable mechanical equivalents thereof obvious to those skilled in the art are set forth in the appended claims.

We claim:

1. In bank drive-up window construction of the type in which an upright window wall having inner and outer sides is formed with a deal drawer opening; in which a receptacle is mounted movable through the wall drawer opening forwardly to a customer accessible position outward of the wall outer side and rearwardly to a teller accessible position rearward of the wall inner side; and in which there is means operably connected to the receptacle for selectively driving the receptacle between the forward customer accessible and rearward teller accessible positions; the improvements including a stationary frame extending rearwardly from the window wall inner side, a main movable frame having forward and rearward ends, means mounting the main movable frame on the stationary frame aligned with the wall drawer opening and movable between rearward and forward positions, the main movable frame in the forward position extending forwardly through the wall drawer opening with the forward end thereof spaced outwardly from the wall outer side, the main movable frame in the rearward position extending rearwardly from the wall with the forward end thereof at the wall drawer opening and the rearward end thereof spaced rearwardly from the wall inner side, an auxiliary movable frame having forward and rearward ends, means mounting the auxiliary movable frame on the main movable frame movable between a forward and rearward position, the auxiliary movable frame when in the forward position being telescoped with and extending substantially between the forward and rearward ends of the main movable frame, the auxiliary movable frame when in the rearward position extending rearwardly from and with the rearward end thereof spaced rearwardly from the rearward end of the main movable frame, means mounting the receptacle on and movable between the auxiliary movable frame forward and rearward ends, the means for driving the receptacle being constructed and arranged for driving the auxiliary movable frame from the auxiliary movable frame forward position to the auxiliary frame rearward position when the receptacle is at the rearward end of the auxiliary movable frame and for driving the receptacle along the auxiliary movable frame between the forward and rearward ends of the main movable frame when the auxiliary movable frame is in the forward position and for driving the main movable frame between the main movable frame forward and rearward positions when the auxiliary movable frame is in the forward position and the receptacle is at the forward end of the main movable frame, latch means operably connected between the receptacle and main movable frame and between the main movable frame and stationary frame for locking the main movable frame to the stationary frame when the receptacle and auxiliary movable frame are driven to move them relative to the main movable frame and for locking the receptacle to the main movable frame when the receptacle and main movable frame are driven to move them relative to the stationary frame, and the receptacle being accessible to the teller when the receptacle is at the rearward end of the auxiliary movable frame and the auxiliary movable frame is in the rearward position and being accessible to the customer when the receptacle is at the main movable frame forward end and the main movable frame is in forward position.

2. Bank drive-up window construction as defined in claim 1 wherein there is a generally horizontal teller's counter extending rearwardly from the wall inner side above the wall drawer opening and above the frames and receptacle; wherein the teller's counter has a rear edge spaced rearwardly from the wall inner side; wherein there is a rear counter wall extending downwardly substantially adjacent the teller's counter rear edge and substantially adjacent the main movable frame rearward end when the main movable frame is in rearward position; wherein a receptacle opening is formed through the rear counter wall aligned with the auxiliary movable frame; wherein the auxiliary movable frame and receptacle move rearwardly and forwardly through the rear counter wall receptacle opening to and from the teller accessible position projecting rearwardly of the counter rear edge when the receptacle is in the rearward end of the auxiliary movable frame; wherein there is rear shield means operably connected for rearward and forward movement with the auxiliary movable frame and receptacle between a forward position closing the rear counter wall receptacle opening when the auxiliary movable frame is in forward position and a rearward position spaced rearwardly from the rear counter wall when the auxiliary movable frame is in rearward position projecting rearwardly of the counter rear edge and the receptacle is in teller accessible position; and wherein there is front end means on the main movable frame for closing the deal drawer opening through the window wall when the main movable frame is in rearward position.

3. Bank drive-up window construction as defined in claim 1 wherein the auxiliary movable frame includes track means mounted for forward and rearward movement on and relative to the main movable frame; and wherein the means mounting the receptacle movable on the auxiliary movable frame includes means mounting the receptacle movable forwardly and rearwardly on the auxiliary movable frame track means.

4. Bank drive-up window construction as defined in claim 1 wherein the means for driving the receptacle includes an electric motor; wherein there is stop switch means on the stationary frame for being actuated to stop the electric motor when the auxiliary movable frame and receptacle have been moved to the auxiliary movable frame rearward position; wherein there is switch actuating means movable between a nonactuating position free of actuating the stop switch means and an actuating position actuating the stop switch means; and wherein there is means operably connected to the receptacle engageable with the switch actuating means on the main movable frame when the receptacle is driven with the auxiliary movable frame to teller accessible position for moving the switch actuating means from nonactuating to actuating position.

5. Bank drive-up window construction as defined in claim 1 wherein the latch means include a reciprocal latch member on the main movable frame, a latch pin on the stationary frame engageable with the latch member when the main movable frame is moved to rearward position locking the main movable frame stationary relative to the stationary frame, a latch pin on the receptacle engageable with the latch member when the receptacle is moved to the forward end of the main movable frame locking the receptacle stationary relative to the main movable frame, and means on the latch member for reciprocating the latch member to release the receptacle latch pin and engage the stationary frame latch pin when the movable frame is moved to rearward position and for reciprocating the latch member to release the stationary frame latch pin and engage the receptacle latch pin when the receptacle is moved to the forward end of the main movable frame.

6. Bank drive-up window construction as defined in claim 1 wherein the latch means includes a reciprocal latch member on the main movable frame, a latch pin on the stationary frame engageable with the latch member when the main movable frame is moved to rearward position locking the main movable frame stationary relative to the stationary frame, a latch pin on the receptacle engageable with the latch member when the receptacle is moved to the forward end of the main movable frame locking the receptacle stationary relative to the main movable frame, and means on the latch member for reciprocating the latch member to release the receptacle latch pin and engage the stationary frame latch pin when the movable frame is moved to rearward position and for reciprocating the latch member to release the stationary frame latch pin and engage the receptacle latch pin when the receptacle is moved to the forward end of the main movable frame; and wherein there is safety interference pin means mounted on the main movable frame movable between a position obstructing movement of the receptacle latch pin into engagement with the latch member when the stationary frame latch pin is engaged with the latch member and a position obstructing the engagement of the stationary frame latch pin by the latch member when the receptable latch pin is engaged by the latch member, and the safety interference pin means being moved between the two positions through the alternate engagement by the respective latch pins when either one of the latch pins is released and the other of the latch pins is engaged by the latch member.

7. Bank drive-up window construction as defined in claim 1 wherein the means mounting the main movable frame on the stationary frame mounts the main movable frame movable forwardly along a progressively and substantially uniformly downwardly angled path of travel from rearward to forward positions and along the same progressively and uniformly angled path of travel rearwardly and upwardly from the forward to rearward positions; wherein the auxiliary movable frame is mounted on the main movable frame and the receptacle is mounted on the auxiliary movable frame movable in paths of travel parallel to the path of travel of the main movable frame; and wherein the receptacle customer accessible position is spaced below the receptacle teller accessible position.

8. Bank drive-up window construction as defined in claim 1 wherein the means for driving the receptacle includes drive chain means operably connected to the main movable frame extending and movable forwardly and rearwardly along the main movable frame, driving pinion means rotatably mounted on the stationary frame and operably engaged with and driving the drive chain means forwardly and rearwardly, means operably connecting the receptacle to and movable with the drive chain means, the drive chain means moving relative to the movable frame driving the auxiliary movable frame through the receptacle between the auxiliary movable frame forward and rearward positions when the receptacle is in the rearward end of the auxiliary movable frame, the drive chain means moving relative to the movable frame driving the receptacle along the auxiliary movable frame between the forward and rearward ends of the main movable frame when the auxiliary movable frame is in the forward position, and the drive chain means being stationary relative to the main movable frame driving the main movable frame through the receptacle between the main movable frame forward and rearward positions when the auxiliary movable frame is in the forward position and the receptacle is at the forward end of the main movable frame.

9. In bank drive-up window construction of the type in which an upright window wall having inner and outer sides is formed with a deal drawer opening; in which a receptacle is mounted movable through the wall drawer opening forwardly to a customer accessible position outward of the wall outer side and rearwardly to a teller accessible position rearward of the wall inner side; and in which there is means operably connected to the receptacle for selectively driving the receptacle between the forward customer accessible and rearward teller accessible positions; the improvements including a stationary frame extending rearwardly from the window wall inner side, a movable frame having forward and rearward ends, means mounting the movable frame on the stationary frame aligned with the wall drawer opening and movable between rearward and forward positions, the movable frame in the forward position extending forwardly through the wall drawer opening with the forward end thereof spaced outwardly from the wall outer side, the movable frame in the rearward position extending rearwardly from the wall with the forward end thereof at the wall drawer opening and the rearward end thereof spaced rearwardly from the wall inner side, means mounting the receptacle on the movable frame for movement between a rearward teller accessible position and a forward position substantially at the movable frame forward end when the movable frame is in the rearward position; the means for driving the receptacle between the forward customer accessible and rearward teller accessible positions comprising drive chain means operably connected to the movable frame extending and movable forwardly and rearwardly along the movable frame, driving pinion means rotatably mounted on the stationary frame and operably engaged with and driving the drive chain means forwardly and rearwardly, means operably connecting the receptacle to and movable with the drive chain means, the drive chain means moving relative to the movable frame driving the receptacle between the rearward teller accessible position and the forward position substantially at the movable frame forward end when the movable frame is in the rearward position and stationary relative to the stationary frame, and the drive chain means being stationary relative to the movable frame driving the movable frame and receptacle relative to the stationary frame between the movable frame rearward position and the movable frame forward position with the receptacle in forward customer accessible position when the receptacle is at the movable frame forward end; and means for retaining the movable frame stationary relative to the stationary frame during movement of the receptacle relative to the movable frame and for retaining the receptacle at the movable frame forward end during movement of the receptacle and movable frame relative to the stationary frame.

10. In bank drive-up window construction of the type in which an upright window wall having inner and outer sides is formed with a deal drawer opening; in which a receptacle is mounted movable through the wall drawer opening forwardly to a customer accessible position outward of the wall outer side and rearwardly to a teller accessible position rearward of the wall inner side; and in which there is means operably connected to the receptacle for selectively driving the receptacle between the forward customer accessible and rearward teller accessible positions, the improvements including a stationary frame extending rearwardly from the window wall inner side, a movable frame having forward and rearward ends, means mounting the movable frame on the stationary frame aligned with the wall drawer opening and movable between rearward and forward positions, the movable frame in the forward position extending forwardly through the wall drawer opening with the forward end thereof spaced outwardly from the wall outer side, the movable frame in the rearward position extending rearwardly from the wall with the forward end thereof at the wall drawer opening and the rearward end thereof spaced rearwardly from the wall inner side, means mounting the receptacle on the movable frame for movement between a rearward teller accessible position and a forward position substantialy at the movable frame forward end when the movable frame is in the rearward position, the means for driving the receptacle between the forward customer accessible and rearward teller accessible positions is constructed and arranged for driving the receptacle between the rearward teller accessible position and the forward position substantially at the movable frame forward end when the movable frame is in rearward position and for driving the movable frame between rearward and forward position when the receptacle is at the forward position substantially adjacent the movable frame forward end, a reciprocal latch member on the movable frame, a latch pin on the stationary frame engageable with the latch member when the movable frame is moved to rearward position locking the movable frame stationary relative to the stationary frame, a latch pin on the receptacle engageable with the latch member when the receptacle is moved to the forward end of the movable frame locking the receptacle stationary relative to the main movable frame, and means on the latch member for reciprocating the latch member to release the receptacle latch pin and engage the stationary frame latch pin when the movable frame is moved to rearward position and for reciprocating the latch member to release the stationary frame latch pin and engage the receptacle latch pin when the receptacle is moved to the forward end of the movable frame.

11. In bank drive-up window construction of the type in which an upright window wall having inner and outer sides is formed with a deal drawer opening; in which a generally horizontal teller's counter extends rearwardly from the wall inner side above the wall drawer opening; in which a receptacle is mounted movable through the wall drawer opening forwardly to a customer accessible position outward of the wall outer side and rearwardly beneath the counter to a teller accessible position rearward of the wall inner side; and in which there is means operably connected to the receptacle for selectively driving the receptacle between the forward customer accessible and rearward teller accessible positions; the improvements including the teller's counter having a rear edge spaced rearwardly from the wall inner side, frame means mounting the receptacle for movement forwardly through the wall drawer opening to the customer accessible position outwardly of the wall outer side and for movement rearwardly beneath the counter and projecting rearwardly of the counter rear edge; said frame means including a stationary frame beneath the teller's counter, a movable frame having forward and rearward ends, means mounting the movable frame on the stationary frame aligned with the wall drawer opening and movable between rearward and forward positions, the movable frame in the forward position extending forwardly through the wall drawer opening with the forward end thereof spaced outwardly from the wall outer side, the movable frame in the rearward position extending rearwardly from the wall with the forward end thereof at the wall drawer opening and the rearward end thereof spaced rearwardly from the wall inner side, front end means on the movable frame for closing the wall drawer opening when the movable frame is in rearward position, and means mounting the receptacle on the movable frame movable between a rearward teller accessible position rearward of the counter rear edge and a forward position substantially adjacent the movable frame front end member when the movable frame is in rearward position; the means for driving the receptacle between the forward customer accessible and rearward teller accessible positions being constructed and arranged for driving the receptacle between the rearward teller accessible position and the forward position substantially adjacent the movable frame front end member when the movable frame is in rearward position, and for driving the movable frame between rearward and foward position when the receptacle is at forward position substantially adjacent the movable frame front end member; means for retaining the movable frame stationary relative to the stationary frame during movement of the receptacle relative to the movable frame, and for retaining the receptacle in forward position substantially adjacent the movable frame front end member during movement of the receptacle and movable frame relative to the stationary frame; and the counter being free of access openings to the receptacle.

12. In bank drive-up window construction of the type in which an upright window wall having inner and outer sides is formed with a deal drawer opening; in which a generally horizontal teller's counter extends rearwardly from the wall inner side above the wall drawer opening; in which a receptacle is mounted movable through the wall drawer opening forwardly to a customer accessible position outward of the wall outer side and rearwardly beneath the counter to a teller accessible position rearward of the wall inner side; and in which there is means operably connected to the receptacle for selectively driving the receptacle between the forward customer accessible and rearward teller accessible positions; the improvements including the teller's counter having a rear edge spaced rearwardly from the wall inner side, frame means mounting the receptacle for movement forwardly through the wall drawer opening to the customer accessible position outwardly of the wall outer side and for movement rearwardly beneath the counter and projecting rearwardly of the counter rear edge; said frame means including a stationary frame beneath the teller's counter, a movable frame having forward and rearward ends, means mounting the movable frame on the stationary frame aligned with the wall drawer opening and movable between rearward and forward positions, the movable frame in the forward position extending forwardly through the wall drawer opening with the forward end thereof spaced outwardly from the wall outer side, the movable frame in the rearward position extending rearwardly from the wall with the forward end thereof at the wall drawer opening and the rearward end thereof spaced rearwardly from the wall inner side, front end means on the movable frame for closing the wall drawer opening when the movable frame is in rearward position, and means mounting the receptacle on the movable frame movable between a rearward teller accessible position rearward of the counter rear edge and a forward position substantially adjacent the movable frame front end member when the movable frame is in rearward position; the means for driving the receptacle between the forward customer accessible and rearward teller accessible positions being constructed and arranged for driving the receptacle between the rearward teller accessible position and the forward position substantially adjacent the movable frame front end member when the movable frame is in rearward position, and for driving the movable frame between rearward and forward position when the receptacle is at forward position substantially adjacent the movable frame front end member; means for retaining the movable frame stationary relative to the stationary frame during movement of the receptacle relative to the movable frame, and for retaining the receptacle in forward position substantantially adjacent the movable frame front end member during movement of the receptacle and movable frame relative to the stationary frame; the counter being free of access openings to the receptacle; a rear counter wall extending downwardly substantially adjacent the teller's counter rear edge and substantially adjacent the movable frame rearward end when the movable frame is in rearward position; there being a receptacle opening formed through the rear counter wall aligned with the movable frame; said means movably mounting the receptacle on the movable frame mounting the receptacle for movement rearwardly and forwardly through the rear counter wall receptacle opening and from the teller accessible position projecting rearwardly of the counter rear edge; and rear shield means operably connected for rearward and forward movement with the receptacle between a forward position closing the rear counter wall receptacle opening when the receptacle is forwardly of the rear counter wall and a rearward position spaced rearwardly from the rear counter wall when the receptacle is in teller accessible position projecting rearwardly of the counter rear edge.

13. In bank drive-up window construction of the type in which an upright window wall having inner and outer sides is formed with a deal drawer opening; in which a receptacle is mounted movable through the wall drawer opening forwardly to a customer accessible position outward of the wall outer side and rearwardly to a teller accessible position rearward of the wall inner side; and in which there is means operably connected to the receptacle for selectively driving the receptacle between the forward customer accessible and rearward teller accessible positions; the improvements including a stationary frame extending rearwardly from the window wall inner side, means operably connecting the receptacle to the stationary frame movable forwardly along a progressively and substantially uniformly downwardly angled path of travel from the rearward teller accessible position to the forward customer accessible position and along the same progressively and uniformly angled path of travel rearwardly and upwardly from the forward customer accessible position to the rearward teller accessible position; the receptacle customer accessible position being spaced below the receptacle teller accessible position; said means operably connecting the receptacle movable on the stationary frame including a movable frame having forward and rearward ends, means mounting the movable frame for movement on the stationary frame aligned with the wall drawer opening between movable frame rearward and forward positions, the movable frame in forward position extending forwardly through the wall drawer opening with the forward end thereof spaced outwardly from the wall outer side, the movable frame in rearward position extending rearwardly from the wall with the forward end thereof at the wall drawer opening and the rearward end thereof spaced rearwardly from the wall inner side, and means mounting the receptacle on the movable frame for movement between the rearward teller accessible position and a forward position substantially at the movable frame forward end when the movable frame is in rearward position; the means for driving the receptacle between the forward customer accessible and rearward teller accessible positions being constructed and arranged for driving the receptacle between the rearward teller accessible position and the movable frame forward end, and for driving the movable frame between rearward and forward position when the receptacle is at the movable frame forward end; and said means mounting the movable frame for movement on the stationary frame mounting the movable frame for movement forwardly along a progressively and substantially uniformly downwardly angled path of travel from the movable frame rearward to forward positions, and the means mounting the receptacle for movement on the movable frame mounting the receptacle for movement on the movable frame in a path of travel parallel to the path of travel of the movable frame on the stationary frame.

14. In bank drive-up window construction, a stationary frame having front and rear ends, an upright window wall at the front end of the frame, an upright rear counter wall at the rear end of the frame, a generally horizontal teller's counter free of access openings mounted on the window and counter walls extending between the window and counter walls above the frame, the counter having a rear edge adjacent the rear counter wall, the window wall being formed with a deal drawer opening adjacent the front end of the frame, the counter wall being formed with a receptacle opening adjacent the rear end of the frame aligned with the deal drawer opening, said deal drawer opening being spaced below said receptacle opening, said aligned openings lying in a path of travel extending at an angle forwardly downwardly from the receptacle opening to the deal drawer opening; a movable frame having front and rear ends, means mounting the movable frame for movement on said stationary frame along said path of travel between a customer accessible position in which the movable frame extends forwardly through the deal drawer opening and a rear position in which the front end of the movable frame is located at the deal drawer opening, movable closure means mounted on and carried by the movable frame at the front end thereof closing the deal drawer opening when the movable frame is in rear position; a receptacle, means mounting the receptacle for movement on the movable frame along said path of travel between a customer accessible position at the front end of the movable frame when the movable frame is in customer accessible position and a teller accessible position rearward of the counter rear edge; means for moving the receptacle relative to the movable frame back and forth between said teller accessible position and a position located beneath said counter between said deal drawer and receptacle openings, and said moving means including means for moving said receptacle along with said movable frame between said position beneath the counter and said customer accessible position; and receptacle opening closure means mounted for movement on said stationary frame along said path of travel movable with said receptacle and closing said receptacle opening when said receptacle is located forwardly of the rear counter wall.

References Cited by the Examiner
UNITED STATES PATENTS

| | | | |
|---|---|---|---|
| 1,684,889 | 9/1928 | Russ | 312—286 |
| 2,353,059 | 7/1944 | Murray | 312—286 |
| 2,896,748 | 7/1959 | McClintock | 109—19 X |
| 2,949,870 | 8/1960 | Graber | 109—19 |
| 2,986,328 | 5/1961 | Delas | 232—43.1 |
| 3,059,840 | 10/1962 | Graber et al. | 232—44 |
| 3,237,853 | 3/1966 | Grosswiller | 232—43.3 |

FRANK B. SHERRY, *Primary Examiner.*

F. K. ZUGEL, *Assistant Examiner.*